(12) United States Patent
Zielinski et al.

(10) Patent No.: US 11,378,018 B2
(45) Date of Patent: Jul. 5, 2022

(54) FUEL METERING SYSTEM

(71) Applicant: HONEYWELL INTERNATIONAL INC., Morris Plains, NJ (US)

(72) Inventors: Edward Zielinski, South Bend, IN (US); Martin Dutka, South Bend, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 133 days.

(21) Appl. No.: 16/898,736

(22) Filed: Jun. 11, 2020

(65) Prior Publication Data

US 2021/0388773 A1    Dec. 16, 2021

(51) Int. Cl.
| | |
|---|---|
| F02C 9/26 | (2006.01) |
| F02C 7/232 | (2006.01) |
| F02C 9/28 | (2006.01) |
| G05D 7/06 | (2006.01) |

(52) U.S. Cl.
CPC .............. *F02C 9/263* (2013.01); *F02C 7/232* (2013.01); *F02C 9/28* (2013.01); *G05D 7/0647* (2013.01); *F05D 2270/301* (2013.01); *F05D 2270/62* (2013.01); *F23N 2235/24* (2020.01)

(58) Field of Classification Search
CPC .... F02C 9/263; F02C 9/32; F02C 7/22; F02C 7/232
See application file for complete search history.

(56) References Cited

U.S. PATENT DOCUMENTS

| | | | | |
|---|---|---|---|---|
| 3,106,934 A | * | 10/1963 | Rogers | G05D 7/03 137/489.5 |
| 3,531,936 A | * | 10/1970 | Widell | F02C 9/32 137/115.12 |
| 3,808,799 A | * | 5/1974 | Taylor | F02C 9/263 60/39.281 |
| 3,991,569 A | | 11/1976 | Smith | |
| 4,187,673 A | * | 2/1980 | Smith | F02C 9/32 60/39.281 |
| 4,745,739 A | * | 5/1988 | Bezard | F02C 9/263 137/614.17 |
| 5,109,664 A | * | 5/1992 | Kester | F02C 7/228 60/773 |
| 5,448,882 A | | 9/1995 | Dyer et al. | |

(Continued)

FOREIGN PATENT DOCUMENTS

| | | |
|---|---|---|
| EP | 1553344 A2 | 7/2005 |
| EP | 3208443 A1 | 8/2017 |

*Primary Examiner* — Alain Chau
(74) *Attorney, Agent, or Firm* — Lorenz & Kopf, LLP

(57) ABSTRACT

A fuel metering system includes a metering valve having a first inlet fluidly coupled to a source of fluid at a first pressure, a second inlet, a first outlet and a second outlet. The metering valve includes a slot, and a valve body movable to control an amount of fluid supplied to the first and second outlet. The fuel metering system includes a servo valve fluidly coupled to the second inlet and to a second source of fluid at a second pressure. The servo valve is in fluid communication with the second inlet and a body of the servo valve is movable to supply a fluid to move the valve body. The slot is configured to variably restrict the flow of the fluid through the second outlet to balance a force applied by a biasing member. The fuel metering system includes a fixed flow restriction downstream of the second outlet.

18 Claims, 4 Drawing Sheets

(56) References Cited

U.S. PATENT DOCUMENTS

| | | | |
|---|---|---|---|
| 5,490,379 A | | 2/1996 | Wernberg et al. |
| 5,709,079 A | | 1/1998 | Smith |
| 5,772,182 A | * | 6/1998 | Stambaugh, Sr ....... F02C 7/232 137/557 |
| 5,896,737 A | * | 4/1999 | Dyer ......................... F02C 7/22 60/773 |
| 5,983,621 A | * | 11/1999 | Stambaugh, Sr ....... F02C 9/263 60/773 |
| 6,381,946 B1 | * | 5/2002 | Wernberg ............... F02C 9/263 60/39.281 |
| 7,178,335 B2 | * | 2/2007 | Bickley ................... F02C 7/232 60/426 |
| 7,234,293 B2 | * | 6/2007 | Yates ...................... F02C 7/232 60/39.281 |
| 8,991,186 B2 | | 3/2015 | Bickley et al. |
| 9,222,418 B2 | | 12/2015 | Bader et al. |
| 9,243,565 B2 | * | 1/2016 | Satienpoch ............. F02C 7/232 |
| 10,450,965 B2 | * | 10/2019 | Ozzello ................... F02C 9/263 |
| 2005/0262824 A1 | * | 12/2005 | Yates ........................ F02C 9/32 60/39.281 |
| 2011/0289925 A1 | * | 12/2011 | Dyer ....................... F02C 7/236 60/734 |
| 2014/0069102 A1 | * | 3/2014 | Satienpoch ............. F02C 7/232 60/734 |
| 2014/0345694 A1 | * | 11/2014 | Ballard ................... F02C 7/232 137/1 |
| 2017/0044993 A1 | * | 2/2017 | Deldalle ................. F02C 9/263 |
| 2018/0066591 A1 | * | 3/2018 | Ozzello ................... F02C 9/263 |

* cited by examiner

FUEL METERING SYSTEM

TECHNICAL FIELD

The present disclosure generally relates to gas turbine engines, and more particularly relates to a fuel metering system including a fuel metering valve for use with a gas turbine engine.

BACKGROUND

Gas turbine engines may be employed to power various devices. For example, a gas turbine engine may be employed to power a mobile platform, such as an aircraft. Generally, gas turbine engines combust fuel supplied by a fuel supply system to drive a turbine to generate power to propel the aircraft. The fuel supply system typically includes a fuel pump to pressurize the fuel and a fuel metering valve to modulate the amount of fuel that is delivered to a combustor. The position of the fuel metering valve may be controlled by a full authority digital engine control (FADEC), acting through an electrohydraulic servo valve (EHSV). In many cases, an electronic position sensor is attached to the fuel metering valve to feedback valve position information to the FADEC, enabling closed-loop control of the fuel flow metering. The inclusion of the position sensor increases the weight, cost, and complexity associated with the fuel supply system.

Accordingly, it is desirable to provide a fuel metering system in which the electronic position sensor is eliminated, and the fuel metering valve operates in an open-loop system, with sufficient accuracy to satisfy the performance needs of the engine. By eliminating the position sensor, the weight associated with the fuel supply system, as well as the cost and complexity, are reduced. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a fuel metering system for a gas turbine engine. The fuel metering system includes a metering valve having a first inlet fluidly coupled to a source of fluid at a first pressure, a second inlet, a first outlet to be coupled to the gas turbine engine and a second outlet. The metering valve includes a slot defined proximate to the second outlet, and a valve body movable to control an amount of fluid supplied to the first outlet and to the second outlet. The metering valve includes a biasing member that applies a force to the valve body. The fuel metering system includes a servo valve fluidly coupled to the second inlet of the metering valve and to a second source of fluid at a second pressure. The servo valve is in fluid communication with the second inlet and a body of the servo valve is movable relative to the second inlet to supply a fluid from the second source of fluid to apply a fluid pressure to move the valve body. The slot is configured to variably restrict the flow of the fluid through the second outlet of the metering valve to modify the fluid pressure exerted on the valve body to balance the force applied by the biasing member. The fuel metering system includes a fixed flow restriction downstream of the second outlet.

A position of the valve body relative to the first outlet is based on a current supplied to the servo valve by a controller associated with the gas turbine engine. The current supplied to the servo valve includes a first current range and a second current range, and a relationship between the current supplied to the servo valve and a position of the valve body is different in the first current range and the second current range. A correlation between an exposed area of the slot and the fixed flow restriction results in a first relationship between the position of the valve body and the current supplied to the servo valve in the first current range, and a second relationship between the position of the valve body and the current supplied to the servo valve in the second current range. The source of fluid is a fuel pump and the second source of fluid is a pressure regulator. The pressure regulator is fluidly coupled to the fuel pump to receive the fuel at the first pressure and to regulate the pressure of the fuel to the second pressure. The second outlet is fluidly coupled to the pressure regulator downstream of the flow restriction. The metering valve includes a third inlet that is fluidly coupled to the second outlet. The pressure regulator includes a regulator valve body movable against a force of a second biasing member by a first regulator control chamber and a second regulator control chamber. The first regulator control chamber is fluidly coupled to the fuel pump to receive the fuel at the first pressure and the second regulator control chamber fluidly coupled to the second outlet. The second outlet is fluidly coupled to the source of fluid downstream of the flow restriction.

Further provided is a fuel metering system for a gas turbine engine. The fuel metering system includes a metering valve having a first inlet fluidly coupled to a fuel pump to receive fuel at a first pressure, a second inlet, a first outlet to be coupled to the gas turbine engine and a second outlet. The metering valve includes a slot defined proximate to the second outlet, and a valve body movable to control an amount of fuel supplied to the first outlet and to the second outlet. The metering valve includes a biasing member that applies a force to the valve body. The fuel metering system includes a pressure regulator fluidly coupled to the fuel pump to receive the fuel at the first pressure, fluidly coupled to the servo valve and fluidly coupled to the second outlet. The pressure regulator includes a regulator valve body movable based on a pressure differential between the fuel at the first pressure and a pressure of a fuel at the first outlet to provide the servo valve with fuel at a second pressure. The fuel metering system includes a servo valve fluidly coupled to the second inlet of the metering valve and to the pressure regulator. The servo valve is in fluid communication with the second inlet and a body of the servo valve is movable relative to the second inlet to supply the fuel from the pressure regulator to apply a fluid pressure to move the valve body. The slot is configured to variably restrict the flow of the fuel through the second outlet of the metering valve to modify the fluid pressure exerted on the valve body to balance the force applied by the biasing member. The fuel metering system includes a fixed flow restriction downstream of the second outlet.

A position of the valve body relative to the first outlet is based on a current supplied to the servo valve by a controller associated with the gas turbine engine. The current supplied to the servo valve includes a first current range and a second current range, and a relationship between the current supplied to the servo valve and a position of the valve body is different in the first current range and the second current range. A correlation between an exposed area of the slot and the fixed flow restriction results in a first relationship between the position of the valve body and the current supplied to the servo valve in the first current range, and a second relationship between the position of the valve body and the current supplied to the servo valve in the second current range. The metering valve includes a third inlet and a third outlet, the third inlet is fluidly coupled to the second outlet. The pressure regulator includes a regulator valve body movable against a force of a second biasing member by a first regulator control chamber and a second regulator control chamber. The first regulator control chamber is fluidly coupled to the fuel pump to receive the fuel at the first pressure and the second regulator control chamber fluidly coupled to the second outlet. The second outlet is fluidly coupled to the fuel pump downstream of the flow restriction.

Also provided is a fuel metering system for a gas turbine engine. The fuel metering system includes a metering valve having a first inlet fluidly coupled to a fuel pump to receive fuel at a first pressure, a second inlet, a first outlet to be coupled to the gas turbine engine and a second outlet. The metering valve includes a slot defined proximate to the second outlet, and a valve body movable to control an amount of fuel supplied to the first outlet and to the second outlet. The metering valve includes a biasing member that applies a force to the valve body. The fuel metering system includes a pressure regulator fluidly coupled to the fuel pump to receive the fuel at the first pressure, fluidly coupled to the servo valve and fluidly coupled to the second outlet. The pressure regulator includes a regulator valve body movable based on a pressure differential between the fuel at the first pressure and a pressure of a fuel at the first outlet to provide the servo valve with fuel at a second pressure. The fuel metering system includes a servo valve fluidly coupled to the second inlet of the metering valve and to the pressure regulator. The servo valve is in fluid communication with the second inlet and a body of the servo valve is movable relative to the second inlet to supply the fuel from the pressure regulator to apply a fluid pressure to move the valve body. A position of the valve body relative to the first outlet is based on a current supplied to the servo valve by a controller associated with the gas turbine engine and the slot is configured to variably restrict the flow of the fuel through the second outlet of the metering valve to modify the fluid pressure exerted on the valve body to balance the force applied by the biasing member. The fuel metering system includes a fixed flow restriction downstream of the second outlet.

The current supplied to the servo valve includes a first current range and a second current range, and a relationship between the current supplied to the servo valve and a position of the valve body is different in the first current range and the second current range. A correlation between an exposed area of the slot and the fixed flow restriction results in a first relationship between the position of the valve body and the current supplied to the servo valve in the first current range, and a second relationship between the position of the valve body and the current supplied to the servo valve in the second current range.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
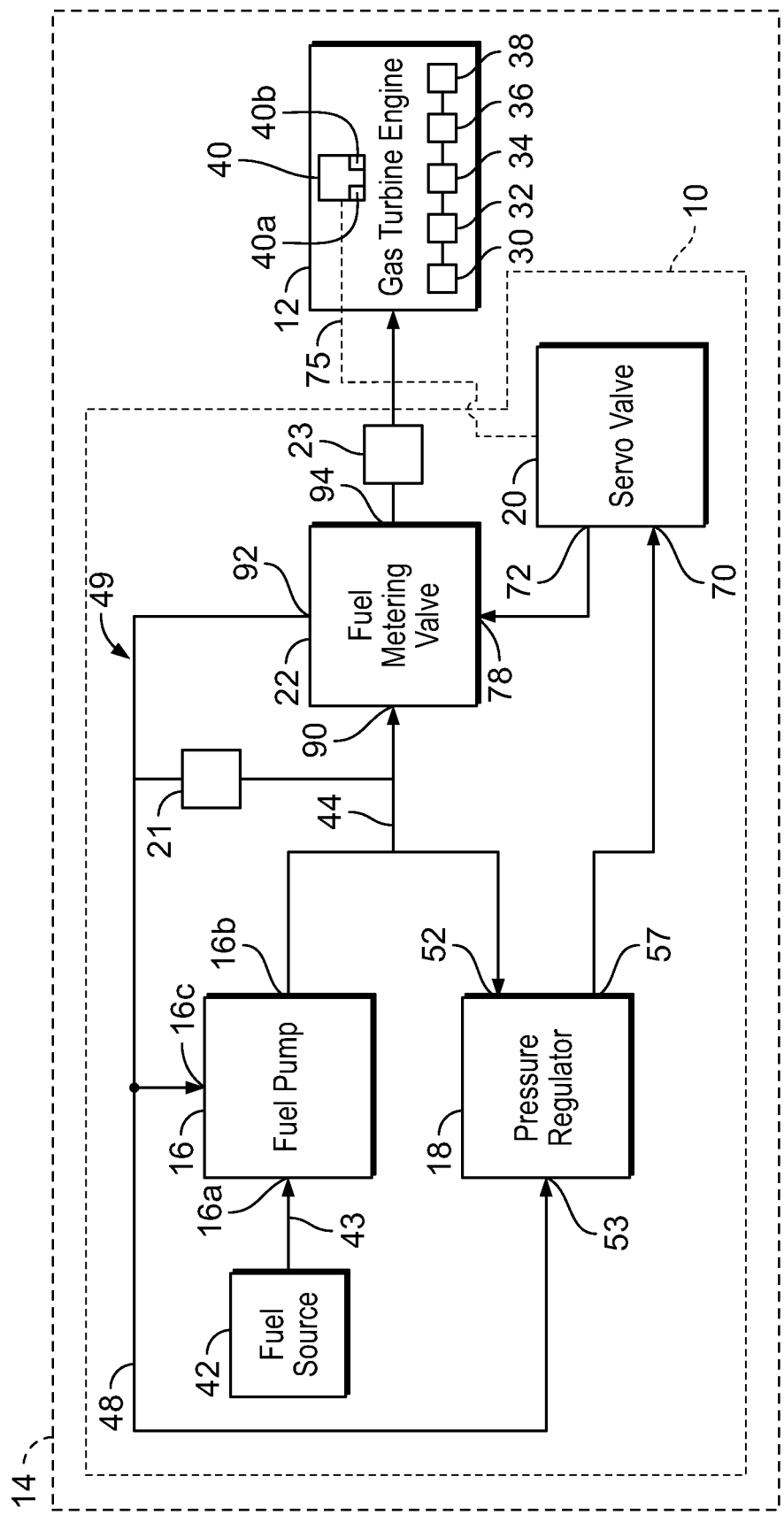
FIG. 1 is a functional block diagram of a fuel metering system for use with a gas turbine engine, which in one example, is onboard a vehicle and includes an exemplary fuel metering valve.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from having an open loop fuel metering system, and the gas turbine engine described herein for use onboard a vehicle is merely one exemplary embodiment according to the present disclosure. In addition, while the fuel metering system is described herein as being used with a gas turbine engine onboard a vehicle, such as a bus, motorcycle, train, motor vehicle, marine vessel, aircraft, rotorcraft and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the fuel metering system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, FIG. 1 is a functional block diagram of a fuel metering system 10 for supplying combustible fuel to an engine, such as a gas turbine engine 12. In this example, the gas turbine engine 12 is onboard a vehicle 14, such as an aircraft. In one example, the fuel metering system 10 includes a fuel pump 16, a pressure regulator 18, an electrohydraulic servo valve or servo valve 20, a fuel metering valve 22, a bypass valve 21 and a combination pressurizing and shutoff valve 23. Generally, as will be discussed, the fuel metering valve 22 controls an amount of fuel received by the gas turbine engine 12 from the fuel pump 16 based on inputs received from the fuel pump 16, the pressure regulator 18 and the servo valve 20. In this regard, a first predefined relationship between a current supplied to the servo valve 20 and a position of the fuel metering valve 22 ensures accuracy in a low-flow region or lower power levels of the gas turbine engine 12, and a second predefined relationship between the current supplied to the servo valve 20 and position of the fuel metering valve 22 ensures sufficient fuel flow when the gas turbine engine 12 is operating at higher power levels where accuracy is generally less critical. Thus, the fuel metering system 10 and the fuel metering valve 22, as discussed herein, provides sufficient accuracy to satisfy the performance requirements of the gas turbine engine 12 without requiring an external position sensor and while operating as an open loop system.

In one example, the gas turbine engine 12 is a non-propulsive engine, such as an Auxiliary Power Unit (APU) deployed onboard the vehicle 14, although other arrangements and uses may be provided. For example, the gas turbine engine 12 may be in the form of a turboprop gas turbine engine within the vehicle 14. In other embodiments, the gas turbine engine 12 may assume the form of an industrial power generator. As the gas turbine engine 12 may be any suitable gas turbine engine for use with the fuel metering system 10, the gas turbine engine 12 will not be discussed in great detail herein.

Briefly, the gas turbine engine 12 includes an intake section 30, a compressor section 32, a combustor section 34, a turbine section 36, and an exhaust section 38. The intake section 30 includes an inlet duct for receiving air from a source, such as a source external to the vehicle 14. The compressor section 32 includes at least one compressor, which is coupled to a shaft. The rotation of the shaft drives the compressor, which draws in air from the inlet duct of the intake section 30. The compressor raises the pressure of the air and directs majority of the high pressure air into the combustor section 34. In one example, the combustor section 34 includes an annular combustor, which receives the compressed air from the compressor, and also receives a flow of fuel from a fuel source 42 via the fuel metering valve 22. The fuel and compressed air are mixed within the combustor, and are combusted to produce relatively high-energy combustion gas. The combustor can be any suitable combustor, including, but not limited to can-type combustors, various reverse-flow combustors, various through-flow combustors, and various slinger combustors. The relatively high-energy combustion gas that is generated in the combustor is supplied to the turbine section 36.

The turbine section 36 includes a turbine. However, it will be appreciated that the number of turbines, and/or the configurations thereof, may vary. The turbine can comprise one of numerous types of turbines including, but not limited to, a vaned radial turbine, a vaneless radial turbine, and a vaned axial turbine. In this embodiment, the high-temperature combusted air from the combustor section 34 expands through and rotates the turbine. The air is then exhausted through the exhaust section 38. As the turbine rotates, it drives equipment in the gas turbine engine 12 via a shaft or spool.

The gas turbine engine 12 also includes a controller 40, such as a full authority digital engine control (FADEC). The controller 40 includes at least one processor 40a and a computer readable storage device or media 40b. The processor 40a can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 40b may include volatile and nonvolatile storage in read-only memory (ROM), random-access memory (RAM), and keep-alive memory (KAM), for example. KAM is a persistent or non-volatile memory that may be used to store various operating variables while the processor 40a is powered down. The computer-readable storage device or media 40b may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling components associated with the gas turbine engine 12, including the fuel metering system 10.

The instructions may include one or more separate programs, each of which comprises an ordered listing of executable instructions for implementing logical functions. The instructions, when executed by the processor 40a, receive and process input signals, perform logic, calculations, methods and/or algorithms for controlling the components of the gas turbine engine 12, including the fuel metering system 10, and generate signals to components of the gas turbine engine 12, including the fuel metering system 10 to control power generated by the gas turbine engine 12, as well as to control an amount of fuel supplied by the fuel metering system 10 based on the logic, calculations, methods, and/or algorithms. Although only one controller 40 is shown in FIG. 1, embodiments of the vehicle 14 can include any number of controllers 40 that communicate over any suitable communication medium or a combination of communication mediums and that cooperate to process the signals received from other systems associated the vehicle 14, perform logic, calculations, methods, and/or algorithms, and generate control signals to control features of the fuel metering system 10 and the gas turbine engine 12.

In various embodiments, one or more instructions of the controller 40 are associated with the fuel metering system 10 and, when executed by the processor 40a, the instructions receive and process signals from a human-machine interface, for example, to determine an amount of fuel needed for the gas turbine engine 12. For example, the instructions of the controller 40, when executed by the processor 40a, determine an amount of current to provide the fuel metering system 10 to result in a predefined amount of fuel for the gas turbine engine 12.

The fuel pump 16 is fluidly coupled to the fuel source 42. In one example, the fuel source 42 is one or more onboard fuel tanks associated with the vehicle 14. The fuel pump 16 draws fuel 43 through a fuel pump inlet 16a from the fuel source 42 and pressurizes the fuel 43 to provide a supply of a high pressure fuel 44, which is fluid or fuel at a first pressure. In one example, the fuel pump 16 is a two-stage device, with a low-pressure centrifugal boost stage followed by a high-pressure positive displacement gear stage, which pressurizes the fuel 43 to more than 1000 pounds per square in gauge (psig). The fuel pump 16 is fluidly coupled upstream from the fuel metering valve 22. The fuel pump 16 provides the fuel metering valve 22 with the high pressure fuel 44 from a fuel pump outlet 16b to a first metering valve inlet 90 of the fuel metering valve 22. The fuel pump 16 is also fluidly coupled upstream from the pressure regulator 18. The fuel pump 16 provides the pressure regulator 18 with the high pressure fuel 44 from the fuel pump outlet 16b to a high pressure regulator inlet 52 of the pressure regulator 18.

The fuel pump 16 is also fluidly coupled to the fuel metering valve 22 to receive a low pressure return or bleed fuel 48 from a first metering valve outlet 92 of the fuel metering valve 22. The low pressure bleed fuel 48 is fluid or fuel at a second pressure, which is different and less than the fluid or fuel at the first pressure (i.e. the high pressure fuel 44). In one example, the fuel pump 16 has a discharge 16c of the low-pressure centrifugal boost stage that is fluidly coupled downstream of the first metering valve outlet 92 of the fuel metering valve 22 to receive the low pressure bleed fuel 48. The fuel pump 16 may mix the low pressure bleed fuel 48 with the discharge 16c of the low-pressure centrifugal boost stage of the fuel pump 16 for pressurizing into the high pressure fuel 44.

The bypass valve 21 regulates the pressure differential across the fuel metering valve 22 and returns unmetered fuel to the low pressure fuel pump inlet 16c of the fuel. The bypass valve 21 comprises any suitable known bypass valve for use with the fuel metering system 10. The bypass valve 21 is downstream of the fuel pump 16 and upstream from the fuel metering valve 22. In one example, the bypass valve 21 is fluidly coupled between the fuel pump 16 and the fuel metering valve 22 to control an amount of the high pressure fuel 44 received at the fuel metering valve 22. In one example, the bypass valve 21 is also fluidly coupled to the fuel pump 16 to return excess fuel to the fuel pump 16. In this regard, in the instance where the fuel pump 16 provides more high pressure fuel 44 than needed at the fuel metering valve 22, the bypass valve 21 reroutes the excess fuel back to the fuel pump 16. Thus, the bypass valve 21 ensures that the fuel metering valve 22 receives the portion of the high pressure fuel 44 needed for the gas turbine engine 12, while maintaining the pressure differential across the fuel metering valve 22.

The combination pressurizing and shutoff valve 23 is downstream of the fuel metering valve 22 and upstream from the gas turbine engine 12. The combination pressurizing and shutoff valve 23 allows or cuts off fuel flow to the combustor. The combination pressurizing and shutoff valve 23 comprises any suitable known combination pressurizing and shutoff valve for use with the fuel metering system 10. In one example, the combination pressurizing and shutoff valve 23 includes a valve body that is spring biased, such that the valve body of the combination pressurizing and shutoff valve 23 is maintained by the spring in a closed position until the fuel pressure within the fuel metering system 10 reaches a minimum pressure. Once the fuel metering system 10 reaches the minimum pressure, the valve body of the combination pressurizing and shutoff valve 23 overcomes the force of the spring to move into an opened position to enable fuel flow to the gas turbine engine 12. Thus, the combination pressurizing and shutoff valve 23 sets the minimum pressure for the fuel metering system 10 and enables the cut off of flow to the combustor based on the pressure within the fuel metering system 10.

Figure 2:
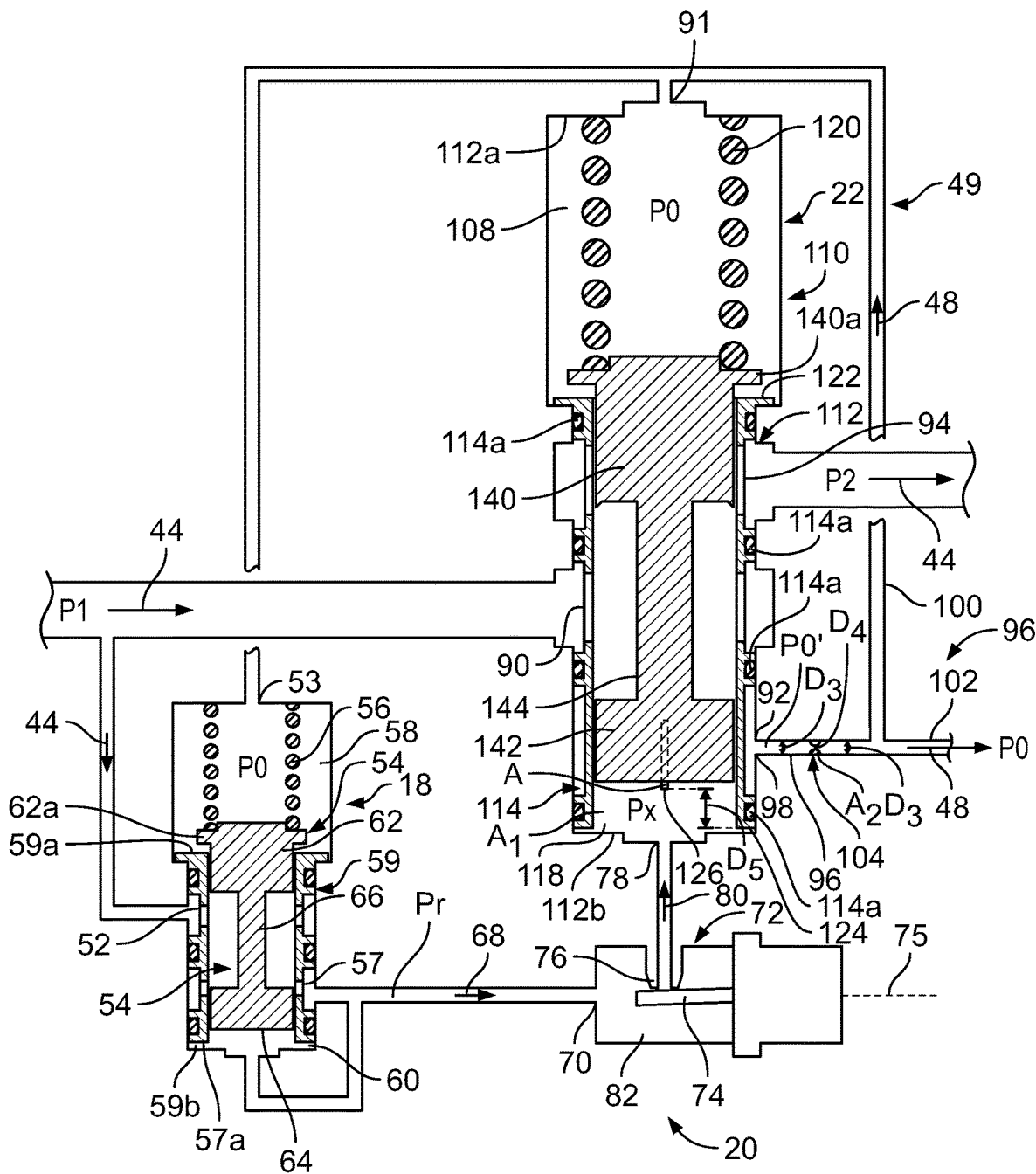
FIG. 2 is a schematic view of the fuel metering system of FIG. 1 in which a current in a first current range is applied to an electrohydraulic servo valve associated with the fuel metering system.

The pressure regulator 18 is fluidly coupled to the fuel pump 16 to receive the high pressure fuel 44 at the high pressure regulator inlet 52. With reference to FIG. 2, the pressure regulator 18 is shown in greater detail. In one example, the pressure regulator 18 includes a valve body 54, a biasing member 56, the high pressure regulator inlet 52, a second regulator inlet 53 and a regulator outlet 57. The valve body 54 is movably or slidably disposed in a mating sleeve 59 between a first regulator control chamber 58 and a second regulator control chamber 60. The mating sleeve 59 is positioned within a stationary housing that is fluidly coupled to the fuel pump 16, the fuel metering valve 22 and the servo valve 20. In this example, the valve body 54 is a piston style, and includes a first head 62 opposite a second head 64. The first head 62 is interconnected with the second head 64 via a valve stem 66. The first head 62 may include a stop flange 62a, which has a diameter that is different and greater than a diameter of the mating sleeve 59 to provide a stop for the travel of the valve body 54 relative to the mating sleeve 59. The first head 62 is in communication with the first regulator control chamber 58. The first regulator control chamber 58 receives the low pressure bleed fuel 48 from a low pressure circuit 49, which is at an outlet pressure P0, via the second regulator inlet 53.

The second head 64 is fluidly coupled to the servo valve 20 and to the regulator outlet 57. The second head 64 is in communication with the second regulator control chamber 60. The second head 64 receives servo supply fuel 68, which is at a servo supply pressure Pr. The second regulator control chamber 60 also receives the servo supply fuel 68. The servo supply fuel 68 is a portion of the high pressure fuel 44 that flows through the pressure regulator 18 based on a position of the valve body 54. The high pressure fuel 44 is at an inlet pressure P1.

The biasing member 56, in this example, is a spring. The biasing member 56 is coupled between the first head 62 and a stationary ground point coincident with the stationary housing of the pressure regulator 18. In one example, the biasing member 56 may be coupled between the first head 62 and a cover that is threadably attached to the stationary housing of the pressure regulator 18. The biasing member 56 acts on or applies a force to the first head 62 and biases the pressure regulator 18 toward a second end 59b of the mating sleeve 59. Generally, the pressure regulator 18 acts to restrict a flowpath through the fuel metering valve 22 to maintain a constant pressure differential for the servo valve 20. The valve body 54 is movable within the mating sleeve 59 against a force of the biasing member 56 based on a magnitude of the pressure of the servo supply fuel 68 discharged from the pressure regulator 18 and the low pressure bleed fuel 48 that flows through the second regulator inlet 53. Stated another way, the valve body 54 is movable against the biasing member 56 based on a pressure differential between the servo supply fuel 68 discharged from the pressure regulator 18 and the low pressure bleed fuel 48, and maintains a substantially constant pressure differential between the two.

The servo valve 20 has a servo inlet 70, a servo outlet 72 and a body or flapper 74. In this example, the servo valve 20 is a single stage electrohydraulic servo valve, which is in communication with the controller 40 (FIG. 1) over a suitable communication medium, such as a bus, to receive a control signal 75. The servo inlet 70 is fluidly coupled to the regulator outlet 57 of the pressure regulator 18, and receives the servo supply fuel 68 at the pressure Pr. The servo outlet 72 is in fluid communication with the fuel metering valve 22. In one example, the servo outlet 72 includes a nozzle 76. The servo outlet 72 provides the servo supply fuel 68 to the fuel metering valve 22 to provide a control fuel 80 at a control pressure Px to the fuel metering valve 22.

The flapper 74 is positioned within a servo chamber 82 so as to obstruct or seal the servo outlet 72 in a first state, and is movable relative to the servo outlet 72 to a second state, in which the servo outlet 72 is substantially unobstructed or fully open. The flapper 74 is also movable to positions between the first state and the second state by the servo valve 20. The flapper 74 is movable by the servo valve 20 relative to the servo outlet 72 based on the control signal 75 received from the controller 40 (FIG. 1). In this example, the control signal 75 is a current that is supplied by the controller 40 (FIG. 1) from a power source onboard the vehicle 14 to the servo valve 20. The power source may comprise any suitable current source associated with the vehicle 14 that is capable of supplying a current to the servo valve 20. As will be discussed, the servo valve 20 moves the flapper 74 relative to the servo outlet 72 based on an amount of a predefined total current. In this example, the flapper 74 obstructs the servo outlet 72 in the first state when the amount of current received is 0% of the total current such that the fuel metering valve 22 is in a first, closed position; and the servo outlet 72 is substantially unobstructed or least obstructed by the flapper 74 in the second state when the amount of current received is at 100% of the total current. In the second state of the flapper 74, the fuel metering valve 22 is in a second, opened position. The flapper 74, and thus, the fuel metering valve 22 are movable to positions between the first, closed position and the second, opened position based on the amount of current received by the servo valve 20. Thus, as will be discussed, an amount of fuel going to the gas turbine engine 12 from the fuel metering valve 22 is also based on the amount of the current supplied to the servo valve 20 from the controller 40 (FIG. 1).

With brief reference to FIG. 1, the fuel metering valve 22 is fluidly coupled to the fuel pump 16 to receive the high pressure fuel 44. The fuel metering valve 22 is also fluidly coupled to the gas turbine engine 12 to provide the gas turbine engine 12 with a metered portion of the high pressure fuel 44. The fuel metering valve 22 is fluidly coupled to the servo valve 20 to receive the control fuel 80, and is fluidly coupled to the low pressure circuit 49 to receive the low pressure bleed fuel 48. With reference to FIG. 2, the fuel metering valve 22 includes the first metering valve inlet 90, the second metering valve inlet 78, a third metering valve inlet 91, a first metering valve outlet 92, and a second metering valve outlet 94. The first metering valve inlet 90 is fluidly coupled to the fuel pump 16 (FIG. 1) to receive the high pressure fuel 44 at the pressure P1. The high pressure fuel 44 enters the fuel metering valve 22 via the first metering valve inlet 90.

The second metering valve outlet 94 is the main metering flow window, which has a tightly controlled shape, that opens up a specific flow area as a function of an axial position of a metering valve body 116. In one example, the second metering valve outlet 94 has a triangular or exponential (trumpet-like) shape. The first metering valve outlet 92 includes a conduit 96 having an inlet 98 defined at the first metering valve outlet 92, a first conduit outlet 100 and a second conduit outlet 102. In this example, a fixed flow restriction 104 is defined within the conduit 96 so as to be downstream of the first metering valve outlet 92 and upstream of each of the first conduit outlet 100 and the second conduit outlet 102. In one example, the fixed flow restriction 104 is a narrowing of the conduit 96 such that the conduit 96 has a first diameter D3 upstream and downstream of the fixed flow restriction 104, and a second diameter D4 at the fixed flow restriction 104, with the first diameter D3 different, and in this example, greater than the second diameter D4. The fixed flow restriction 104 reduces a pressure P0' of the low pressure bleed fuel 48 that is received through the first metering valve outlet 92. After passing through the fixed flow restriction 104, the low pressure bleed fuel 48 at a pressure P0 flows through the first conduit outlet 100 and the second conduit outlet 102. The first conduit outlet 100 is fluidly coupled to a first metering control chamber 108 to provide the low pressure bleed fuel 48 to the first metering control chamber 108 and is fluidly coupled to the first regulator control chamber 58 to provide the low pressure bleed fuel 48 to the first regulator control chamber 58. The second conduit outlet 102 is fluidly coupled to the fuel pump 16 (FIG. 1) to return the low pressure bleed fuel 48 to the discharge 16c of the low-pressure centrifugal boost stage of the fuel pump 16. The first conduit outlet 100 and the second conduit outlet 102 define the low pressure circuit 49 that receives and supplies the low pressure bleed fuel 48 to the pressure regulator 18, the fuel metering valve 22 and to return the low pressure bleed fuel 48 to the discharge 16c of the low-pressure centrifugal boost stage of the fuel pump 16.

The second metering valve outlet 94 is downstream of the first metering valve inlet 90. The high pressure fuel 44 flows through the fuel metering valve 22 from the first metering valve inlet 90 to the second metering valve outlet 94. The second metering valve outlet 94 is fluidly coupled to the combination pressurizing and shutoff valve 23, which in turn, is fluidly coupled to the gas turbine engine 12 to provide the gas turbine engine 12 with the high pressure fuel 44. Generally, the high pressure fuel 44 at pressure P1 enters the fuel metering valve 22 via the first metering valve inlet 90 and flows through the fuel metering valve 22 to the second metering valve outlet 94 at pressure P2. The P1-P2 pressure differential is the differential across the metering window or the second metering valve outlet 94 and is maintained essentially constant by the bypass valve 21.

The second metering valve inlet 78 is fluidly coupled to the servo chamber 82 to receive the control fuel 80 based on the position of the flapper 74. The third metering valve inlet 91 is fluidly coupled to the first metering control chamber 108 and is fluidly coupled to the low pressure circuit 49 to receive the low pressure bleed fuel 48. The third metering valve inlet 91 supplies the low pressure bleed fuel 48 to the first metering control chamber 108. Thus, the first regulator control chamber 58 and the first metering control chamber 108 are supplied with the low pressure bleed fuel 48 from the low pressure circuit 49 in parallel.

In this example, the fuel metering valve 22 includes a housing 110, which defines a bore 112 and also includes a valve sleeve 114 that receives a metering valve body 116. The metering valve body 116 is responsive to the first metering control chamber 108 and a second metering control chamber 118 to move or slide within the valve sleeve 114 to control an amount of the high pressure fuel 44 that is supplied to the second metering valve outlet 94; and to control an amount of the control fuel 80 that is supplied as the low pressure bleed fuel 48 to the first metering valve outlet 92. In this example, the fuel metering valve 22 also includes a biasing member 120, which acts on or applies a force to the metering valve body 116. The valve sleeve 114 has a first sleeve end 122 opposite a second sleeve end 124. The first metering valve inlet 90, the second metering valve inlet 78, a third metering valve inlet 91 and a second metering valve outlet 94 are each defined in the valve sleeve 114. The housing 110 is stationary, and includes fluid conduits, for fluidly coupling the first metering valve inlet 90, the second metering valve inlet 78, the third metering valve inlet 91, the low pressure circuit 49, the first metering valve outlet 92 and the second metering valve outlet 94 to the respective one of the fuel pump 16, the servo valve 20 and the combination pressurizing and shutoff valve 23. The housing 110 may also define an annulus about the valve sleeve 114 at the first metering valve inlet 90 and the second metering valve outlet 94 to facilitate the flow of the high pressure fuel 44 through the valve sleeve 114 at the first metering valve inlet 90 and the second metering valve outlet 94. The first metering valve inlet 90 and the second metering valve outlet 94 are each fluidly coupled to the valve sleeve 114 between the first sleeve end 122 and the second sleeve end 124. The second metering valve inlet 78 is fluidly coupled to a second end 112b of the bore 112 to be in fluid communication with the valve sleeve 114. The second end 112b is opposite a first end 112a. The third metering valve inlet 91 is fluidly coupled to the valve sleeve 114 at the first sleeve end 122. The first metering valve outlet 92 is fluidly coupled to a slot 126 defined in the valve sleeve 114.

Figure 3:
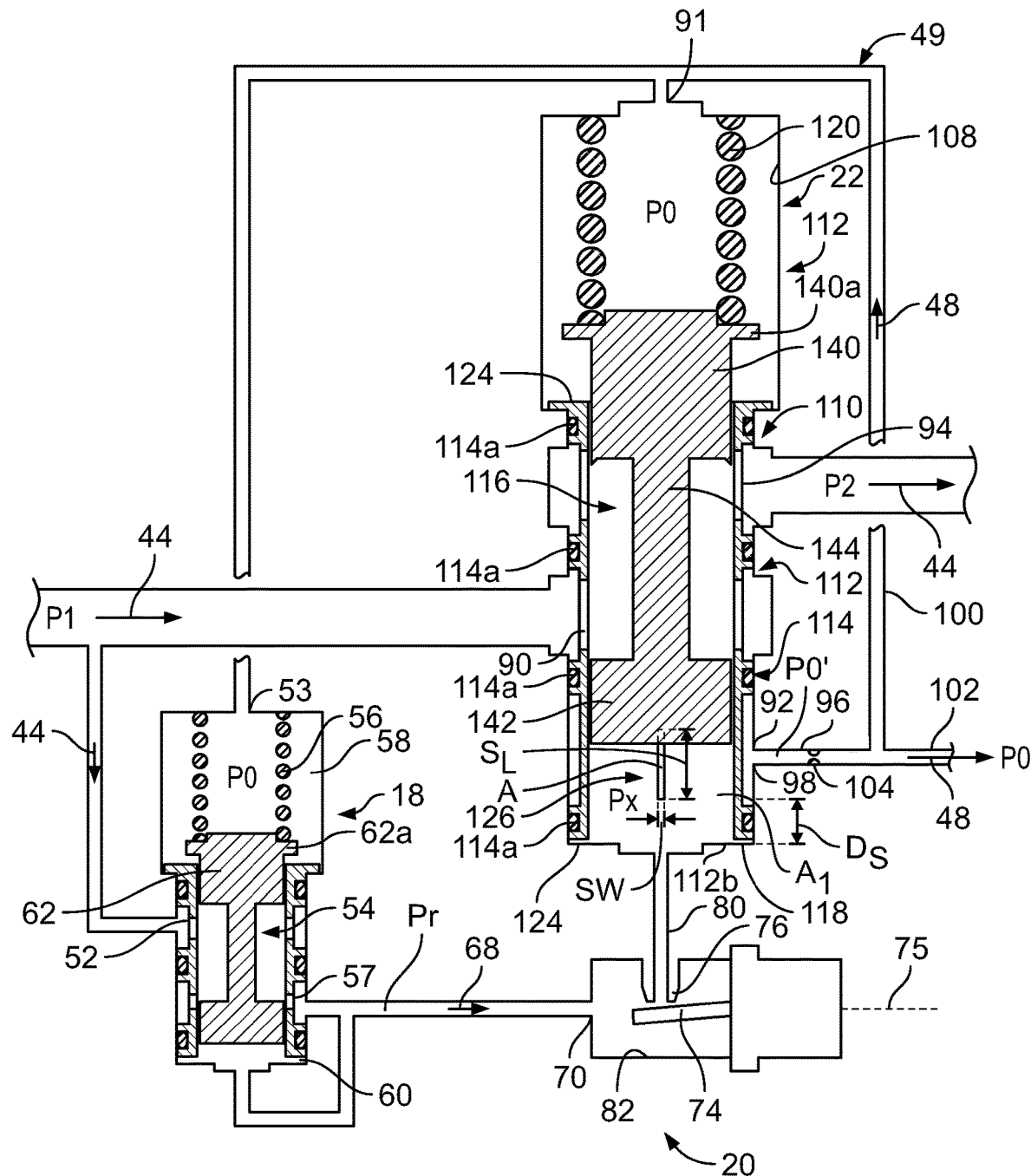
FIG. 3 is a schematic view of the fuel metering system of FIG. 1 in which a current in a second current range is applied to the electrohydraulic servo valve associated with the fuel metering system.

In this regard, with reference to FIG. 3, the slot 126 is defined in the valve sleeve 114 between the first sleeve end 122 and the second sleeve end 124. In this example, the slot 126 is defined a distance Ds from the second sleeve end 124. The distance Ds is predetermined such that the slot 126 is opened coincident with or just before the point at which second metering valve outlet 94 is opened by the movement of the metering valve body 116. Opening the slot 126 before the second metering valve outlet 94 opens ensures that the second metering valve outlet 94 is closed when zero current is applied to the servo valve 20. Thus, in this example, the slot 126 is defined proximate or adjacent to the second sleeve end 124. The slot 126 is also defined proximate or adjacent to the first metering valve outlet 92. The slot 126 extends for a length Sl that is predetermined to be greater than the total stroke of the metering valve body 116, such that the flow area of the slot 126 is continuously modulated throughout the full stroke range of the metering valve body 116. A width Sw of the slot 126 is predetermined as a function of the flow capacity of the servo valve 20 and the size of the fixed flow restriction 104 to produce the predetermined or predefined flow vs current relationship shown in FIG. 4. To minimize flow through the flow path defined by the first metering valve outlet 92, the width Sw of the slot 126 may be set to the minimum limit of manufacturing capability, on the order of 0.020 inches, if desired.

Generally, the slot 126 is defined so as to be in fluid communication with the second metering control chamber 118 and in fluid communication with the first metering valve outlet 92. The slot 126 has a cross-sectional area A that is different and less than a cross-sectional area A1 of the second metering control chamber 118. The cross-sectional area A of the slot 126 is also different, and greater than, a cross-sectional area A2 (FIG. 2) of the fixed flow restriction 104. The slot 126 is also fluidly coupled to an annulus defined in the housing 110, and the annulus fluidly couples the slot 126 to the first metering valve outlet 92 and the conduit 96 upstream from the fixed flow restriction 104. As will be discussed, a movement of the metering valve body 116 axially relative to the valve sleeve 114 against the biasing member 120 opens and closes the slot 126, which cooperates with the metering valve body 116 to control an amount of high pressure fuel 44 flowing to the gas turbine engine 12 (FIG. 1) when a low current is supplied to the servo valve 20 and an amount of the control fuel 80 that flows to the first metering valve outlet 92. The valve sleeve 114 may include one or more sealing members 114a, such as elastomeric O-rings, etc., to inhibit the flow of fuel between the valve sleeve 114 and the bore 112.

With reference back to FIG. 2, the metering valve body 116 is movably or slidably disposed in the valve sleeve 114 between the first metering control chamber 108 and the second metering control chamber 118. In this example, the metering valve body 116 is a piston style, and includes a first metering head 140 opposite a second metering head 142. The first metering head 140 is interconnected with the second metering head 142 via a valve stem 144. The first metering head 140 may include a stop flange 140a, which has a diameter that is different and greater than a diameter of the valve sleeve 114 to provide a stop for the travel of the metering valve body 116 relative to the valve sleeve 114. Generally, when the stop flange 140a contacts the valve sleeve 114, the slot 126 is closed by the metering valve body 116. The low pressure bleed fuel 48 in the first metering control chamber 108 applies a fluid pressure that acts on the first metering head 140; and the control fuel 80 in the second metering control chamber 118 applies a fluid pressure that acts on the second metering head 142. The second metering head 142 is movable relative to the valve sleeve 114 against the force of the biasing member 120 to expose the slot 126 (FIG. 3). The slot 126 variably restricts the flow of the control fuel 80 through the first metering valve outlet 92 to modify the fluid pressure exerted on the metering valve body 116 to balance the force applied by the biasing member 120 on the metering valve body 116.

The biasing member 120, in this example, is a spring. The biasing member 120 is coupled between the first metering head 140 and a stationary ground point coincident with the stationary housing 110 of the fuel metering valve 22. In one example, the biasing member 56 may be coupled between the first metering head 140 and a cover that is threadably attached to the housing 110 of the fuel metering valve 22. The biasing member 120 acts on or applies the force to the first metering head 140 and biases the fuel metering valve 22 toward the second end 112*b* of the bore 112. Generally, the biasing member 56 and the biasing member 120 are referenced to the same pressure P0 or the low pressure bleed fuel 48 received from the low pressure circuit 49.

Generally, the metering valve body 116 is movable against a force of the biasing member 120 to expose or open the slot 126 based on a current applied to the servo valve 20. In this regard, the metering valve body 116 is movable against the biasing member 120 based on a fluid pressure differential between the control fuel 80 at the control pressure Px and the low pressure bleed fuel 48 at the pressure P0. As the amount of current supplied by the controller 40 (FIG. 1) via the control signal 75 to the servo valve 20 increases, the servo valve 20 moves the flapper 74 to increase an amount of the control fuel 80 entering through the nozzle 76. As the current is increased, the flow through the nozzle 76 of the flapper 74 is increased, which increases the control pressure Px. The higher control pressure Px causes the metering valve body 116 to move against the biasing member 120, opening the slot 126 (FIG. 3). The opening of the slot 126 dumps or reduces the control pressure Px, and the metering valve body 116 stops at a new, more open, position once equilibrium is achieved. Therefore, for every current applied to the servo valve 20 there is a corresponding position of the fuel metering valve 22, and the combination of the slot 126 and the fixed flow restriction 104, in concert with the variable flow through the nozzle 76 of the flapper 74, creates the characteristic curve shown in FIG. 4.

Figure 4:
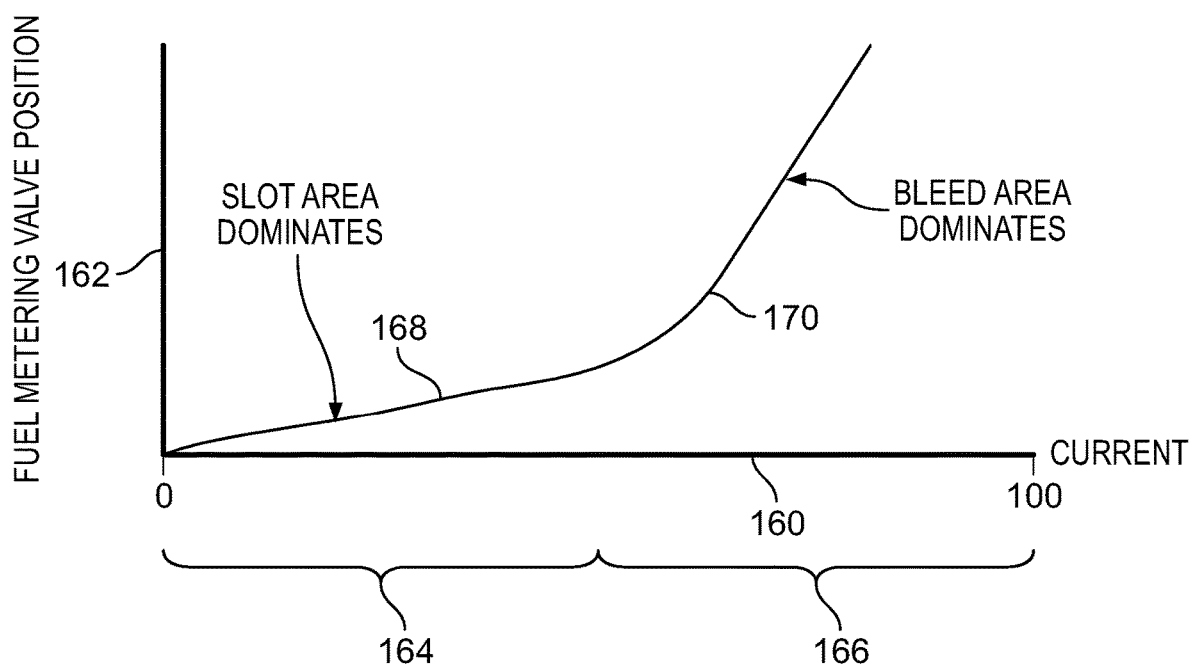
FIG. 4 is a graph of a position of a valve body of the fuel metering valve based on an amount of current supplied to the electrohydraulic servo valve in accordance with the teachings of the present disclosure.

In one example, with reference to FIG. 4, a graph of an applied current to the servo valve 20 versus a position of the metering valve body 116 of the fuel metering valve 22 is shown. In this example, the applied current is on an x-axis 160, and the position of the metering valve body 116 of the fuel metering valve 22 is on a y-axis 162. In this example, the position of the metering valve body 116 relative to the second metering valve outlet 94 is based on the current supplied to the servo valve 20 by the controller 40 (FIG. 1). As shown, in a first current range 164, from about 0% to about 60% of total current, the relationship between an exposed cross-sectional area A of the slot 126 to the cross-sectional area A2 of the fixed flow restriction 104 results in a first relationship 168 between the position of the metering valve body 116 and the current supplied to the servo valve 20. In the first current range 164, the slope of the curve of the position of the metering valve body 116 relative to the current supplied to the servo valve 20 is shallow, and the exposed cross-sectional area A of the slot 126 (FIG. 3) dominates this position relationship. In a second current range 166, from about 60% to about 100% of total current, the relationship between the exposed cross-sectional area A of the slot 126 to the cross-sectional area A2 of the fixed flow restriction 104 results in a second relationship 170 between the position of the metering valve body 116 and the current supplied to the servo valve 20. In the second current range 166, the slope of the curve of the position of the metering valve body 116 relative to the current supplied to the servo valve 20 is steeper, and the cross-sectional area A2 of the fixed flow restriction 104 (FIG. 3) dominates this position relationship.

Thus, in the first current range 164, the first relationship 168 ensures the accuracy of the high pressure fuel 44 supplied by the fuel metering valve 22 to the gas turbine engine 12 (FIG. 1) when low fuel quantities are needed such as at start-up of the gas turbine engine 12 (FIG. 1). In the second current range 166, shown in FIG. 2A, the second relationship 170 provides a higher flow capacity for the high pressure fuel 44 through the fuel metering valve 22 when larger quantities of fuel are needed outside of start-up, during normal operation of the gas turbine engine 12 (FIG. 1), for example. Generally, when it is desired to provide a higher volume of fuel to the gas turbine engine 12 (FIG. 1) in the second current range 166, the accuracy of the provided volume of fuel may not be as critical.

Thus, with reference to FIG. 2, the fuel metering system 10 is an open-loop system, which eliminates the need for a position sensor as the slot 126 (FIG. 3) defined in the valve sleeve 114 cooperates with the fixed flow restriction 104 to define a metering valve position relationship as shown in FIG. 4. In this regard, as the flow area through the servo outlet 72 increases with current through the movement of the flapper 74, the control fuel 80 supplied to the second metering control chamber 118 increases, which causes fluid pressure to increase and move the metering valve body 116 against the force of the biasing member 120 while also opening the slot 126 (FIG. 2A). The opening of the slot 126 reduces the pressure within the second metering control chamber 118. The movement of the metering valve body 116 stops when the flow of the control fuel 80 and the force of the biasing member 120 balance or an equilibrium state is achieved. The result is that for every current applied to the servo valve 20 by the controller 40 (FIG. 1) there is a corresponding position of the metering valve body 116. In addition, the fixed flow restriction 104 positioned downstream of the slot 126 creates a "knee" in the relationship or curve of the applied current versus position of the metering valve body 116 shown in FIG. 4. Without the fixed flow restriction 104, this curve would be substantially linear. At a low percentage of the total current applied, the cross-sectional area A of the slot 126 is small in comparison to the cross-sectional area A2 of the fixed flow restriction 104 (FIG. 3), creating a low slope region in the curve, dominated by the cross-sectional area A of the slot 126. At a high percentage of the total current applied, the cross-sectional area A2 of the fixed flow restriction 104 is relatively smaller in comparison with the cross-sectional area A of the slot 126, creating the higher slope region. In a typical embodiment, the low slope region would be such that 10% of the maximum metered flow level provided by the fuel metering valve 22 would be reached at 50% of the maximum current of the servo valve 20, with the corresponding high flow region configured to reach 100% metered flow provided by the fuel metering valve 22 at 100% or maximum current of the servo valve 20.

By having the low slope region of the curve at the low percentage of current applied minimizes the effect of potential servo valve current shifts, which improves fuel metering valve 22 position accuracy for open-loop flow scheduling at the start of the gas turbine engine 12. In this regard, some servo valves may tend to shift in performance due to a number of factors, including, but not limited to fuel temperature, fuel pressure and vibration, as well as creeping over time in service. The flatness in the curve shown in FIG. 4, where accuracy is more critical (i.e. the low flow region of the gas turbine engine 12) makes the metered flow provided by the fuel metering valve 22 less susceptible to these shifts. In addition, the low slope region may be flattened further as necessary by utilizing a triangular, exponential (trumpet-shaped) or similarly shaped metering port downstream of the slot 126.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel metering system for a gas turbine engine, comprising:
   a metering valve having a first inlet fluidly coupled to a source of fluid at a first pressure, a second inlet, a first outlet to be coupled to the gas turbine engine and a second outlet, the metering valve including a slot defined proximate to the second outlet, a valve body movable to control an amount of fluid supplied to the first outlet and to the second outlet, and a biasing member that applies a force to the valve body;
   a servo valve fluidly coupled to the second inlet of the metering valve and to a second source of fluid at a second pressure, the servo valve in fluid communication with the second inlet and a body of the servo valve is movable relative to the second inlet to supply a fluid from the second source of fluid to apply a fluid pressure to move the valve body, a position of the valve body relative to the first outlet is based on a current supplied to the servo valve, the current supplied to the servo valve includes a first current range and a second current range, a correlation between an exposed area of the slot and a fixed flow restriction results in a first relationship between the position of the valve body and the current supplied to the servo valve in the first current range and a second relationship between the position of the valve body and the current supplied to the servo valve in the second current range, the first relationship different from the second relationship, and the slot is configured to variably restrict the flow of the fluid through the second outlet of the metering valve to modify the fluid pressure exerted on the valve body to balance the force applied by the biasing member; and
   the fixed flow restriction downstream of the second outlet.

2. The fuel metering system of claim 1, wherein the current is supplied to the servo valve by a controller associated with the gas turbine engine.

3. The fuel metering system of claim 1, wherein the source of fluid is a fuel pump and the second source of fluid is a pressure regulator.

4. The fuel metering system of claim 3, wherein the pressure regulator is fluidly coupled to the fuel pump to receive the fuel at the first pressure and to regulate the pressure of the fuel to the second pressure.

5. The fuel metering system of claim 3, wherein the second outlet is fluidly coupled to the pressure regulator downstream of the flow restriction.

6. The fuel metering system of claim 5, wherein the metering valve includes a third inlet that is fluidly coupled to the second outlet.

7. The fuel metering system of claim 3, wherein the pressure regulator includes a regulator valve body movable against a force of a second biasing member by a first regulator control chamber and a second regulator control chamber, the first regulator control chamber fluidly coupled to the fuel pump to receive the fuel at the first pressure and the second regulator control chamber fluidly coupled to the second outlet.

8. The fuel metering system of claim 1, wherein the second outlet is fluidly coupled to the source of fluid downstream of the flow restriction.

9. A fuel metering system for a gas turbine engine, comprising:
   a metering valve having a first inlet fluidly coupled to a fuel pump to receive fuel at a first pressure, a second inlet, a first outlet to be coupled to the gas turbine engine and a second outlet, the metering valve including a slot defined proximate to the second outlet, a valve body movable to control an amount of fuel supplied to the first outlet and to the second outlet, and a biasing member that applies a force to the valve body;
   a pressure regulator fluidly coupled to the fuel pump to receive the fuel at the first pressure, fluidly coupled to a servo valve and fluidly coupled to the second outlet, the pressure regulator including a regulator valve body movable based on a pressure differential between the fuel at the first pressure and a pressure of a fuel at the first outlet to provide the servo valve with fuel at a second pressure;
   the servo valve fluidly coupled to the second inlet of the metering valve and to the pressure regulator, the servo valve in fluid communication with the second inlet and a body of the servo valve is movable relative to the second inlet to supply the fuel from the pressure regulator to apply a fluid pressure to move the valve body, and the slot is configured to variably restrict the flow of the fuel through the second outlet of the metering valve to modify the fluid pressure exerted on the valve body to balance the force applied by the biasing member; and
   a fixed flow restriction downstream of the second outlet.

10. The fuel metering system of claim 9, wherein a position of the valve body relative to the first outlet is based on a current supplied to the servo valve by a controller associated with the gas turbine engine.

11. The fuel metering system of claim 10, wherein the current supplied to the servo valve includes a first current range and a second current range, and a relationship between the current supplied to the servo valve and a position of the valve body is different in the first current range and the second current range.

12. The fuel metering system of claim 11, wherein a correlation between an exposed area of the slot and the fixed flow restriction results in a first relationship between the position of the valve body and the current supplied to the servo valve in the first current range, and a second relationship between the position of the valve body and the current supplied to the servo valve in the second current range.

13. The fuel metering system of claim 9, wherein the metering valve includes a third inlet and a third outlet, the third inlet is fluidly coupled to the second outlet.

14. The fuel metering system of claim 9, wherein the pressure regulator includes a regulator valve body movable against a force of a second biasing member by a first regulator control chamber and a second regulator control chamber, the first regulator control chamber fluidly coupled to the fuel pump to receive the fuel at the first pressure and the second regulator control chamber fluidly coupled to the second outlet.

15. The fuel metering system of claim 9, wherein the second outlet is fluidly coupled to the fuel pump downstream of the flow restriction.

16. A fuel metering system for a gas turbine engine, comprising:
a metering valve having a first inlet fluidly coupled to a fuel pump to receive fuel at a first pressure, a second inlet, a first outlet to be coupled to the gas turbine engine and a second outlet, the metering valve including a slot defined proximate to the second outlet, a valve body movable to control an amount of fuel supplied to the first outlet and to the second outlet, and a biasing member that applies a force to the valve body;
a pressure regulator fluidly coupled to the fuel pump to receive the fuel at the first pressure, fluidly coupled to a servo valve and fluidly coupled to the second outlet, the pressure regulator including a regulator valve body movable based on a pressure differential between the fuel at the first pressure and a pressure of a fuel at the first outlet to provide the servo valve with fuel at a second pressure;
the servo valve fluidly coupled to the second inlet of the metering valve and to the pressure regulator, the servo valve in fluid communication with the second inlet and a body of the servo valve is movable relative to the second inlet to supply the fuel from the pressure regulator to apply a fluid pressure to move the valve body, with a position of the valve body relative to the first outlet based on a current supplied to the servo valve by a controller associated with the gas turbine engine and the slot is configured to variably restrict the flow of the fuel through the second outlet of the metering valve to modify the fluid pressure exerted on the valve body to balance the force applied by the biasing member; and
a fixed flow restriction downstream of the second outlet.

17. The fuel metering system of claim 16, wherein the current supplied to the servo valve includes a first current range and a second current range, and a relationship between the current supplied to the servo valve and a position of the valve body is different in the first current range and the second current range.

18. The fuel metering system of claim 17, wherein a correlation between an exposed area of the slot and the fixed flow restriction results in a first relationship between the position of the valve body and the current supplied to the servo valve in the first current range, and a second relationship between the position of the valve body and the current supplied to the servo valve in the second current range.

* * * * *